(12) United States Patent
Capella

(10) Patent No.: US 6,943,297 B2
(45) Date of Patent: Sep. 13, 2005

(54) LOW VOLTAGE DEVICE USED AS AN ELECTRICAL OUTLET BASE PLATE

(75) Inventor: Joaquin Aubert Capella, Barcelona (ES)

(73) Assignee: Simon S.A., Barcelona (ES)

(*) Notice: Subject to any disclaimer, the term of this patent is extended or adjusted under 35 U.S.C. 154(b) by 0 days.

(21) Appl. No.: 10/867,359

(22) Filed: Jun. 14, 2004

(65) Prior Publication Data

US 2004/0257181 A1 Dec. 23, 2004

(30) Foreign Application Priority Data

Jun. 17, 2003 (ES) .......................................... 200301412

(51) Int. Cl.$^7$ ................................................ H02G 3/14
(52) U.S. Cl. ............................ 174/66; 174/67; 220/241
(58) Field of Search ............................ 174/66, 67, 135; 220/241, 242; D8/353; D13/177; 335/18

(56) References Cited

U.S. PATENT DOCUMENTS

| | | | | |
|---|---|---|---|---|
| 5,895,888 A | * | 4/1999 | Arenas et al. ................. | 174/66 |
| 6,037,542 A | * | 3/2000 | McCall ......................... | 174/66 |
| 6,806,425 B1 | * | 10/2004 | O'Neill ......................... | 174/66 |
| 6,852,929 B2 | * | 2/2005 | Scudder ........................ | 174/66 |

FOREIGN PATENT DOCUMENTS

ES          1 046 592          1/2001

* cited by examiner

Primary Examiner—Dhiru R. Patel
(74) Attorney, Agent, or Firm—Michael J. Striker

(57) ABSTRACT

A low voltage device to be used as an electrical outlet base plate has a frame, an external plate fittable under pressure on the frame and fastenable by elastic plugs having protrusions for easy removal of the external plate, the frame having a rectangular central opening allowing to place one or several mechanisms to be installed and fastened, while the external plates being provided with one or several related openings depending on the mechanisms to be installed, the mechanisms having a body for application of a first base plate for electrical outlet with a base having two poles, and earth connection, a second base plate for electrical outlet with a base having two pairs of poles with its related earth connection in a duplex arrangement, and a third base plate for electrical outlet of the duplex arrangement provided with a differential ground fault circuit interrupter, each of the base plates being provided with a safety plate device for preventing access within an area of contacts.

10 Claims, 11 Drawing Sheets

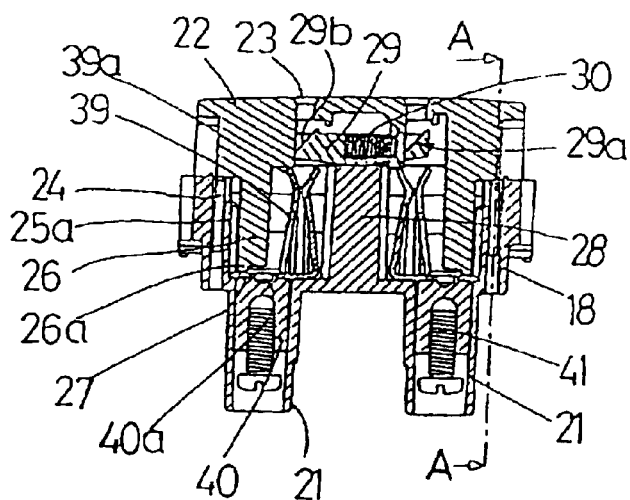
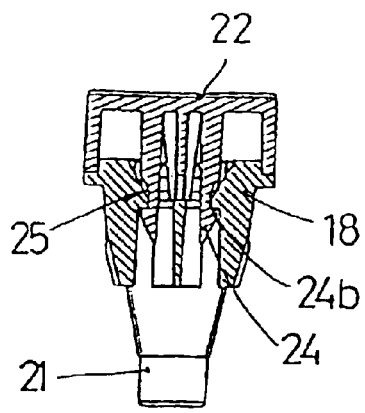
FIG.14  FIG.15
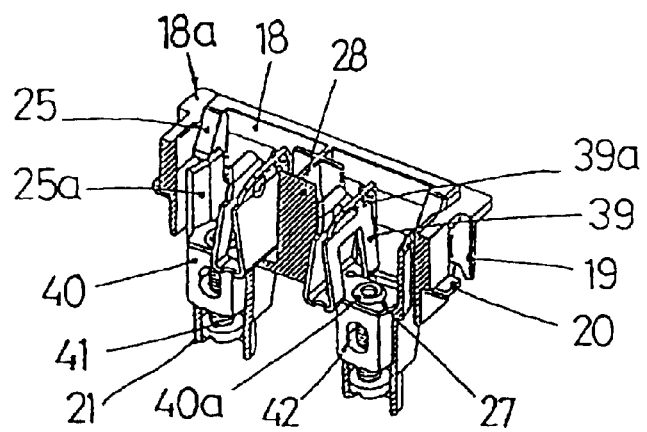
FIG.16
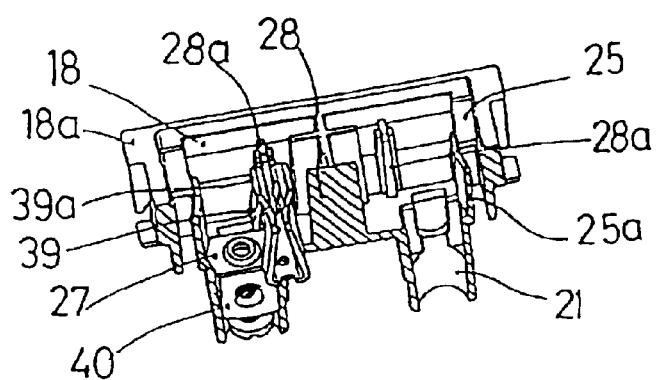
FIG.17

LOW VOLTAGE DEVICE USED AS AN ELECTRICAL OUTLET BASE PLATE

BACKGROUND OF THE INVENTION

This patent of invention has as object improvements introduced to the low voltage devices designed to be used as an electrical outlet base plate the essential characteristics of which are disclosed below.

One of the characteristics to be met according to the modern production techniques, logistics and installation, by all the electrical driving and control devices as well for their low or high voltage applications, is the exchangeability of its different components as well as to be easy to mount and install.

With the former, manufacture, storage and logistics costs are significantly cut down due to the possibilities to considerably decrease the number of different components to be used for producing the devices, with the later, a significant reduction of the skilled workforce is saved for mounting and servicing the installations as it is very easy to mount or dismount the different electrical devices, operations which are quickly and effectively carried out and using a minimum of tools and accessories.

PRIOR ART

The fact that in a same plate and corresponding frame different types of outlet base plate may be exchanged in not known because always when one has to place another type of electrical outlet the whole device is to be changed, which is very disturbing and obviously expensive.

U200001679 discloses shutting devices for base plates of electrical outlets the characteristic of which consists in that an internal part pressed by a filar spring having free ends determines the closure or the non passage of the plugs. The shutting part moves on a straight plane.

SUMMARY OF THE INVENTION

The improvements to which this patent of invention refers are applied to exchangeable elements which will be mounted on frames completed with a snap clamp plate elements which will remain perfectly located and connected and which show as an essential characteristic the special arrangement of its components which will allow to install on a same multiple frame base plates of electrical outlet having different outlets or poles, equipped or not with earth connection, either simple or duplex, in addition to differential (GFCI) and also equipped with a safety plate, the said bases showing a structure which allow to easily and quickly mounting it as well as dismounting it with the advantages all this means in the costs of installation and servicing as well in those of economic nature referring to the manufacture and storage, as it permits to, exchange its components.

Along this description, the essential characteristics below will be specially emphasized:

The crawling between the external plate and the frame;
The variations of the external plate for mounting a single base plate for an outlet having two poles or two poles and the earth connection and for mounting the two base plates considered as simple mechanisms;
The base plate of the two poles outlet and the pressure junction of its cover with the body thereof, as well as the ways the contacts are fastened by the lower part by means of the cover itself and last the body placement and fastening on the frame;
The safety plates which prevent the access within the area of the contacts, preventing the likelihood of accidents, disclosing the elements which compose it and its operation;
The base plate of the electrical outlet with the variation with two poles plus a simple earth connection, among other details, fastening the earth connection contact, pressed by the cover itself on its top part and the shape of the different contacts being disclosed;
The base plate of the electrical outlet, in its variation for two pairs of outlets or poles, with an earth connection each, in a so-called duplex arrangement, its installation in the frame and the distribution of the contact bars; and
last, the base plate in its variation with two pairs of poles and earth connection, in a duplex arrangement, equipped with the differential device GFCI, showing the variations existing in the frame and the external plate, necessary for mounting and fastening the said base plate of the electrical outlet.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 14 is an elevation view of same mechanism sectional by its longitudinal plane;

FIG. 15 is a side view of same mechanism, through the section of plane AA;

FIG. 16 is a view in perspective and partly sectional of the body of the said mechanism according to above figures showing the location of the contacts;

FIG. 17 is another view, also in perspective and particularly sectional of same body of the mechanism according to the preceding figure, showing the internal small walls and an already installed contact;

FIG. 18 the action of the plate before introducing a sharp-pointed element by one of the openings of the cover of the mechanism;

FIG. 19 the intent to introduce the sharp-pointed element through the other opening;

FIG. 20 the action of the two plug prongs starting to impinge on the safety plate; and FIG. 21 the penetration of the plug plugs;

DESCRIPTION OF THE PREFERRED EMBODIMENTS

Figure 6:
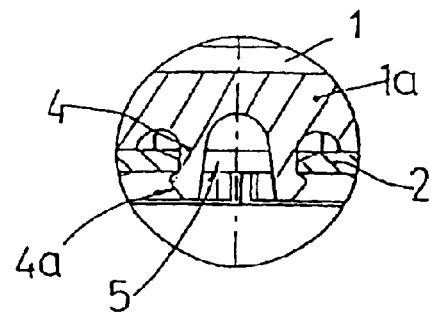
FIG. 6 is a bottom view, at larger scale, showing the detail of a fastening clip of the base plate on the frame.

According to the drawings, the improvements introduced in those low voltage devices designed to be used as base plate for electrical outlets, consist in a top external plate (1) which is perfectly fit on the perimetral edge (2) of the frame (3) and remains fastened and locked by the clamping action of the plugs (4) located in pairs under the end sides (1a) and (1B) of the plate (1). The said plugs possess an external protrusion (4a) at its lower part so that when they are introduced in the rectangular opening (5) located at the area corresponding to the perimetral edge (2) of the frame (3) they penetrate thanks to the elasticity proper of the material, the protrusions (4a) remaining retained under the edges of related rectangular opening (5) pierced in the frame (3) as it is illustrated in details in FIG. 6.

The fact that those external protrusions (4a) of the plugs (4) have their top edge slightly inclined, will also allow to easily withdraw the plate (1) from its place on the frame (3) when it is required to dismount the unit.

Last, on the lower edge of the plate (1) rectangular flanges (6) are also located which are introduced in respective and corresponding rectangular openings (7) the said frame (3) possesses on its edge (2) the function of which is to perfectly fit the said plate and prevent it is unwillingly moved.

Figure 1:
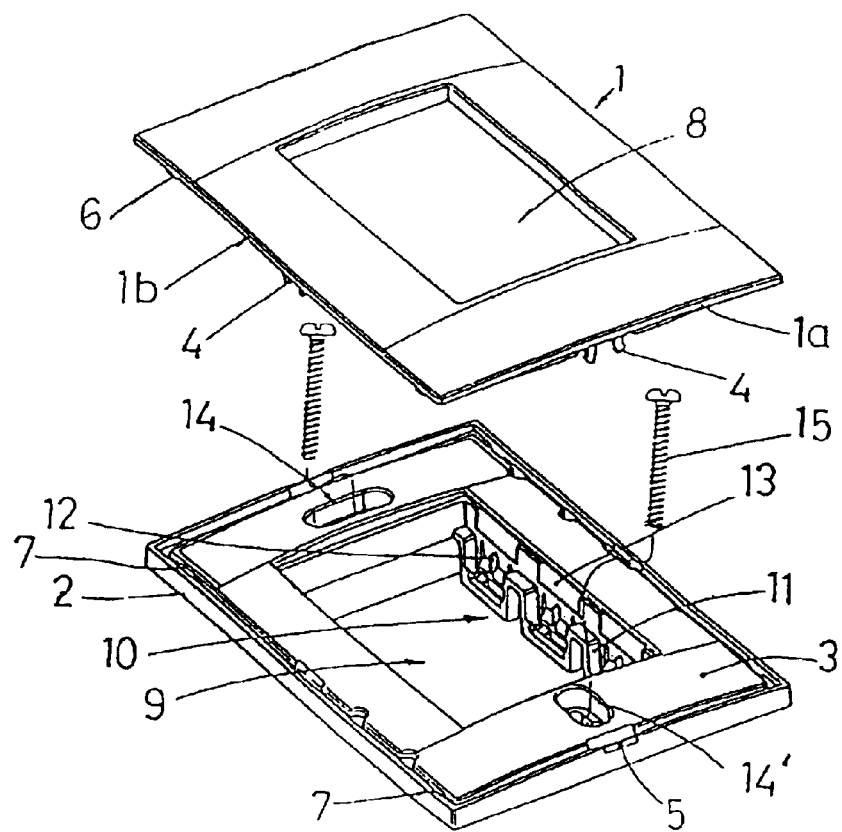
FIG. 1 is a view in perspective of the plate and the frame, exploded in the embodiment of the plate when three simple mechanisms are to be installed in it.

The said plate (1) possesses a central opening (8) having a perfectly rectangular shape coinciding in sizes and shape with the central opening (9) that the frame (3) also possesses, an opening in which will remain placed the mechanisms which will be installed in the device disclosed, which in the case illustrated as for example in FIG. 1 will be with three mechanisms arranged one close to the other or a duplex.

Figure 2:
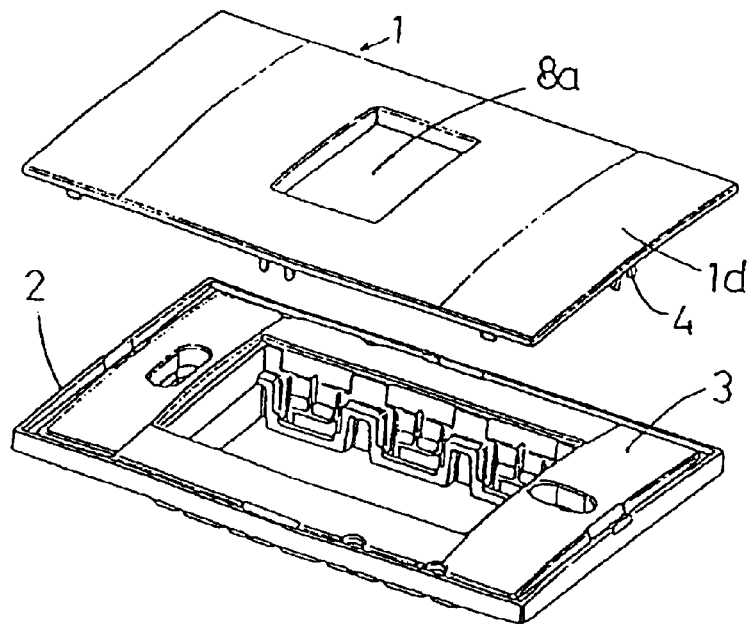
FIG. 2 is a view in perspective, similar to that of the preceding figure but showing a variation of the embodiment of the plate, a single mechanism is to be installed.
Figure 3:
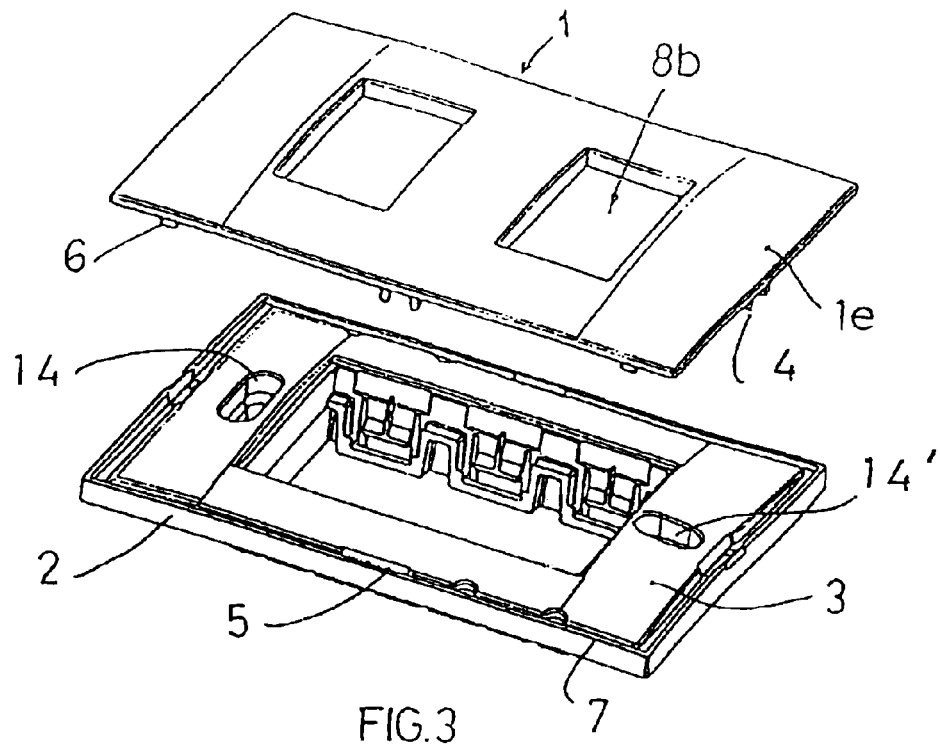
FIG. 3 is a view in perspective, similar to the two preceding figures, but showing a third variation of embodiment of the plate, when two mechanisms are to be installed.
Figure 4:
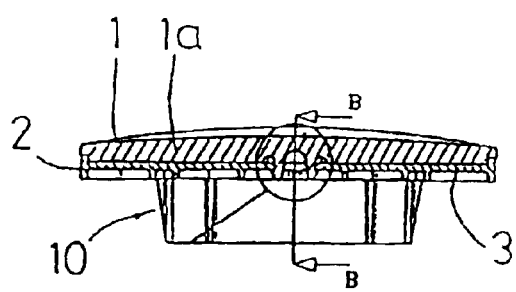
FIG. 4 is a sectional view of the base plate and the frame joined, this cross section being through A—A.

This coincidence will not exist in the event that two elements or a single one are installed, embodiments in which the top external plate (1d) will have a single central opening (8a) centered with respect to its center line having dimensions coinciding with those of a mechanism (see FIG. 2) or two openings (8b) symmetrically located on both sides and each of them having sizes coinciding with each of the two mechanisms to be mounted, with the plate (1e) (FIG. 3).

Figure 5:
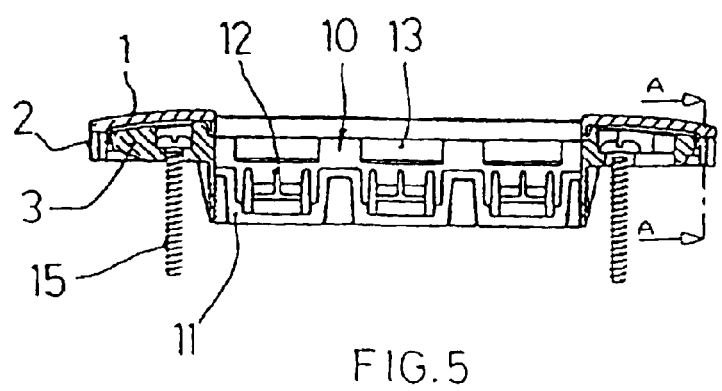
FIG. 5 is another sectional view of same unit as in the preceding figure, this time in a longitudinal section through B—B.

In order to allow the quick mounting of such mechanisms, the frame (3) is provided, on its two side walls facing each other (10) with a series of flanges and protrusions grouped, in the case illustrated in three identical sets, symmetrically arranged, consisting in a stepped edge (11) having an inverted trapezoid shape, which delimits the three areas in which central part inverted T-shaped flanges (12) are arranged as well as a rectangular undercutting (13) located at the top part, near to the higher edge of above mentioned side faces (10). These details are perfectly clear in FIG. 5.

The frame is provided in addition with the already known end sides oblong holes (14) (14') through which as usual the screws (15) will be positioned to fastened the frame at its place of location. The alignment of the larger axes is at 90 degree just to make fastening or dismounting the said frame (3) easy.

Figure 7:
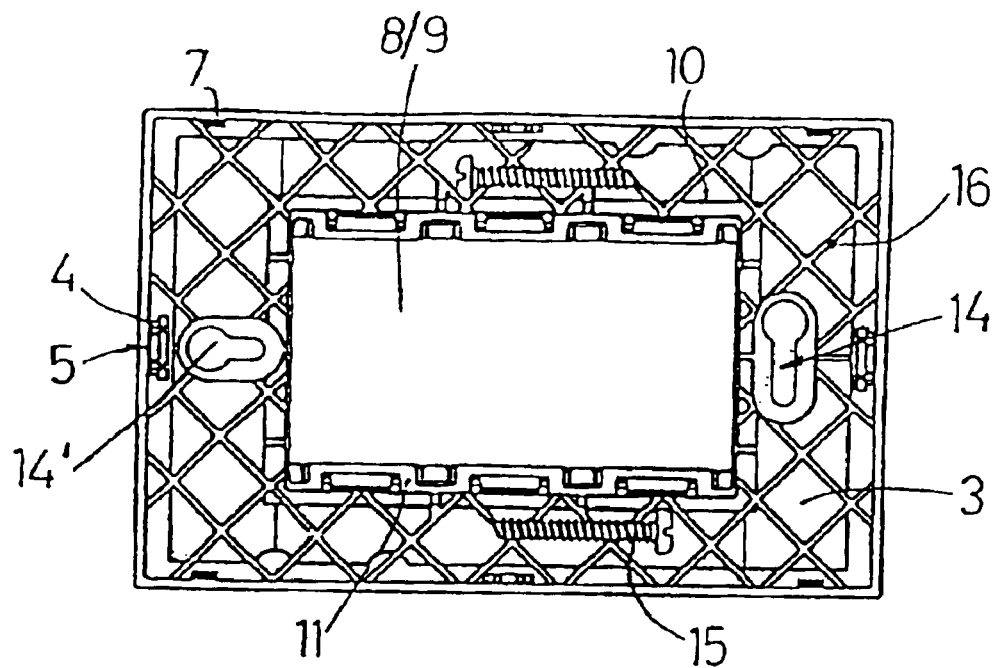
FIG. 7 is a bottom plan-view of the frame showing the arrangement of the set screws of the said frame, during the storage and transport.
Figure 8:
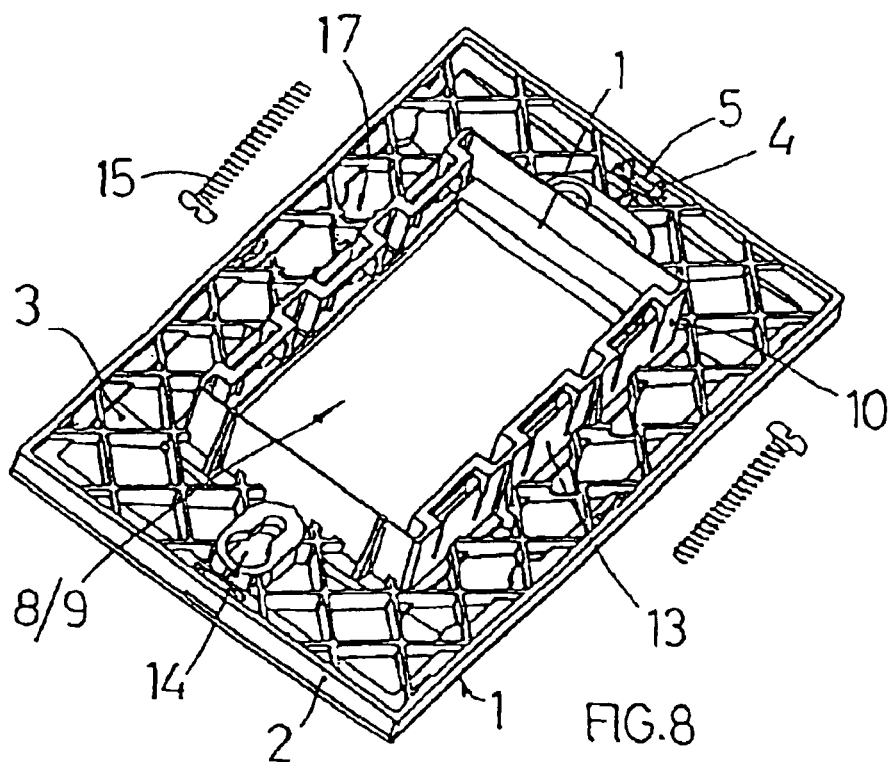
FIG. 8 is a view in perspective corresponding to same frame of the preceding figure.

The frame shows in addition on its lower face, an intercrossed rib (16) which strengthens the unit; on the sides thereof some of those ribs possess a small undercutting (17) which allows to place there under pressure as shown in FIG. 7, the set screws (15) during the storage and transport of the unit, preventing that they are lost.

The unit of the mechanism for base plate for electrical outlet having two poles and its variation with two poles and an earth connection (examples illustrated in FIGS. 9 and 22) are constituted by the body (18) and (38), practically the same in these variations and which possesses on its two front faces the upright flanges (19) which fit by sliding on the internal sides of the corresponding stepped edge (11) and with the upright protrusions of the flange (12) the frame (3) possesses on its internal faces (10).

When the said body (18) goes down, the lower horizontal flanges (20) located between the upright flanges (19) remain locked under the related horizontal length of the inverted T-shaped flange (12). This way, the said body (18) remains strongly fastened and locked at its place of installation and use.

Figure 12:
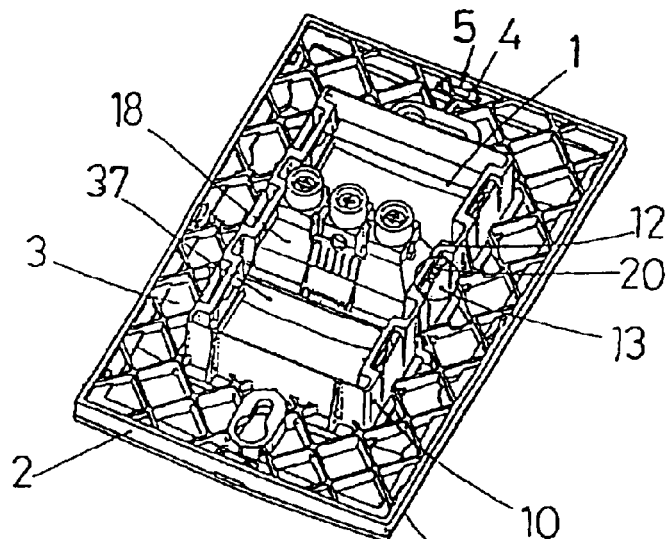
FIG. 12 illustrates a bottom view in perspective of the frame and the plate with a single mechanism fastened on the said frame and on suitable plate and frame for the installation of the three mechanisms.
Figure 13:
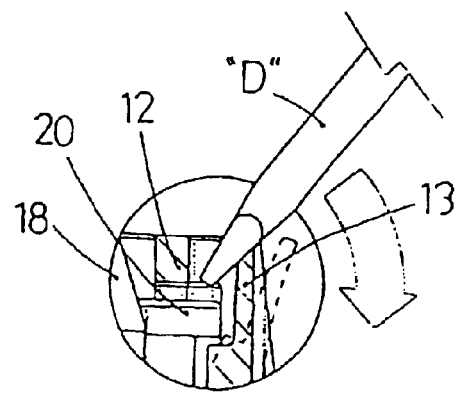
FIG. 13 is a detail at a larger scale of the mechanical way for withdrawing the mechanisms after they have been installed in their place.

The elasticity of the materials with which as well the body as the frame are made will allow to easily place the said body (18) in the frame (3) as well as its quick and easy withdrawal as it is illustrated in the FIGS. 12 and 13 by means of the lever action of a screwdriver (D), for example, separating the wall (13) backwards and releasing the lower horizontal flanges (20) from the body (18) which are fastened under the inverted T-shaped flange (12).

At the top part of the body (18) there is a perimetral edge having a quadrangular section (18a) which is supported on the top part of the stepped trapezoid edge (11) of the frame (3) allowing then that the said body 18 remains perfectly fit.

The body base (18) possesses cylindrical tubular appendages (21), which at their beginning are trunco-pyramid-shaped and within which are located the connection bodies of the contacts of the mechanism, the said appendages (21) being provided with openings (21a) for the entrance of the cables to be connected.

Figure 22:
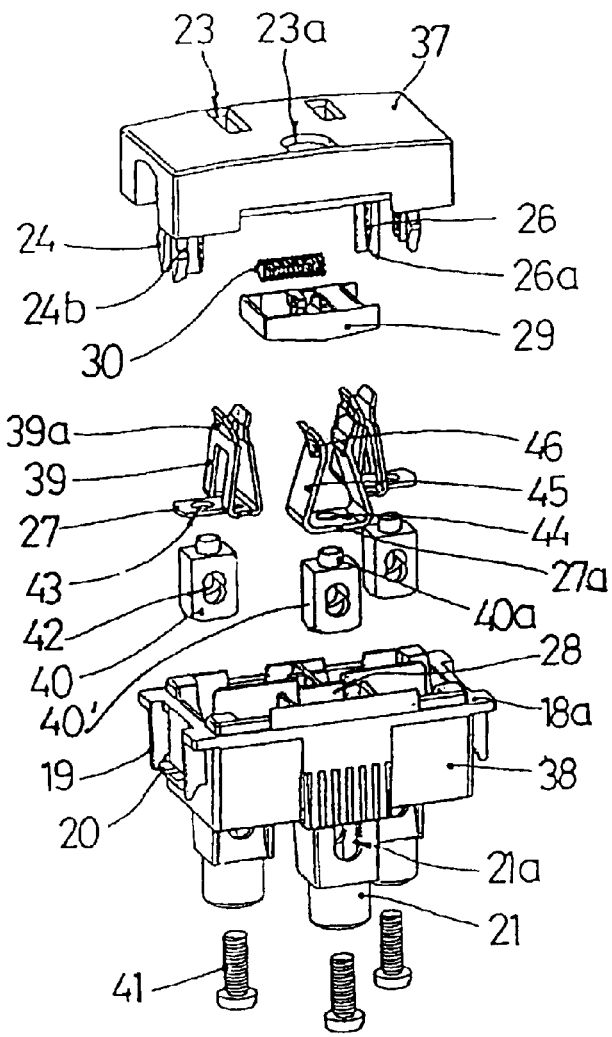
FIG. 22 is a view of the base mechanism for electrical outlet in its embodiment with two poles and an earth connection, illustrated in perspective and with all its elements separated and exploded showing the location of all of them.

According to the embodiment and application of the mechanism of the base plate of the electrical outlet and according to the illustrations of the different drawings, on the frame (3), indistinctly one, two or three bodies (18) may be placed for making the base plate of the electrical outlet having two tapping points or poles (according to FIG. 9) or similar bodies for making the base plate with two poles and earth connection (according to FIG. 22).

Figure 27:
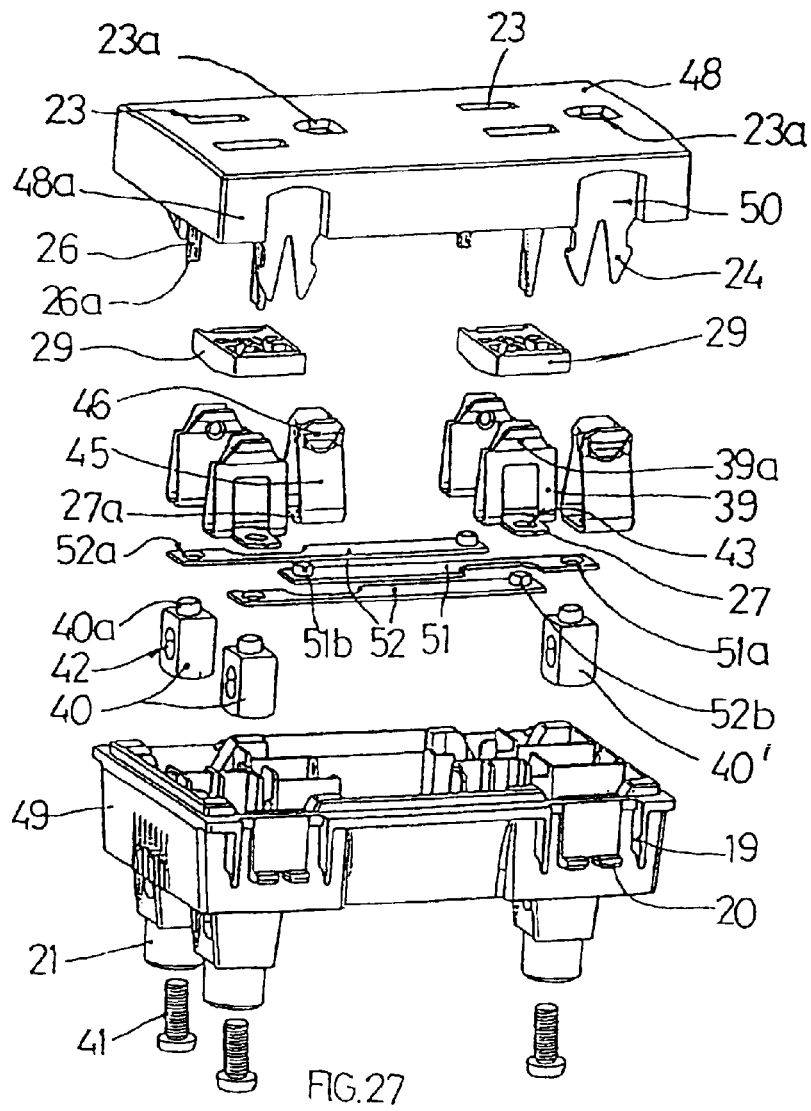
FIG. 27 is a view in perspective and an exploded view of the base mechanism for electrical outlet in its duplex embodiment with two pairs of poles and its respective earth connection, showing the location of all its components.
Figure 28:
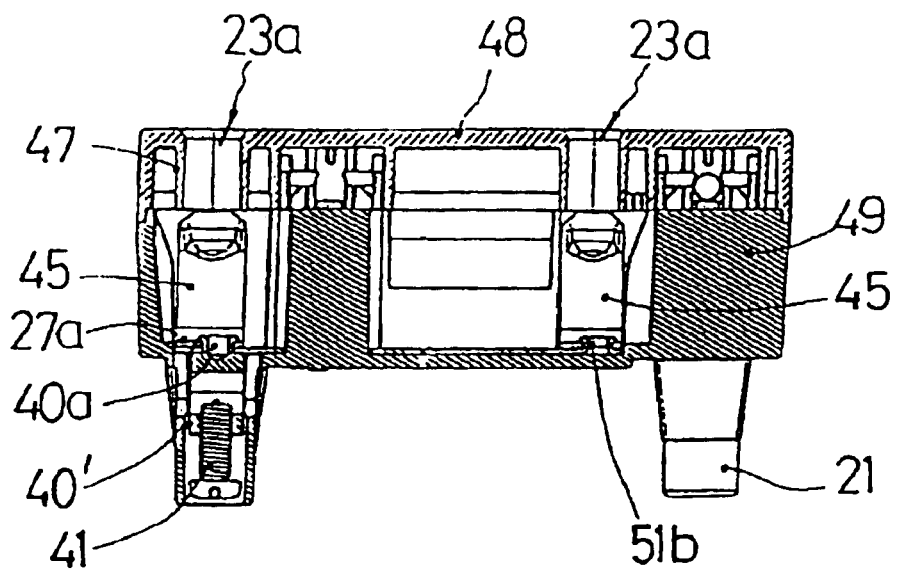
FIG. 28 is an elevation view and sectional by the longitudinal central plane of same duplex mechanism but modifying the position of an earth connection with respect to the preceding figure.
Figure 29:
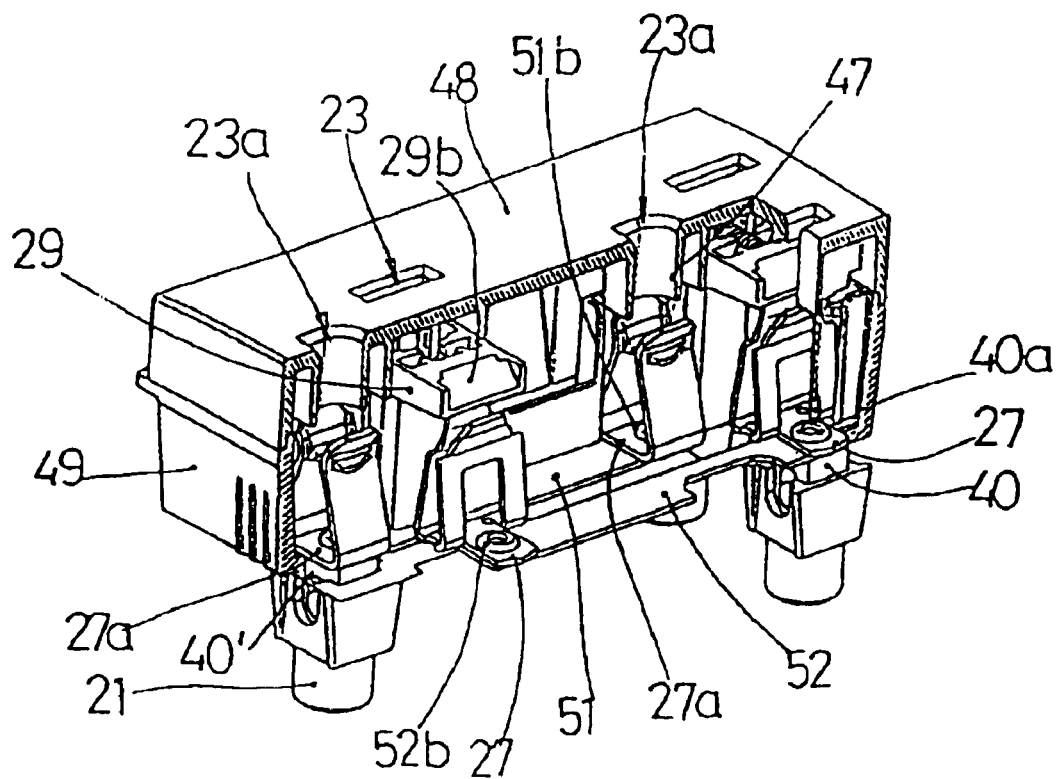
FIG. 29 is a view in perspective of the mechanism corresponding to the two preceding two figures partly sectional by its central part showing the arrangement of the contacts and the joining bars between them but corresponding to the situation of the earth connection at FIG. 23.

In the duplex embodiments, that is to say, with two sets of poles and earth connection (FIGS. 27 to 29), the sizes of the body (49) are coincident with those of the central opening (9) of the frame (3), therefore it will be only the mechanism which will have available the said frame (3) and plate (1).

Figure 30:
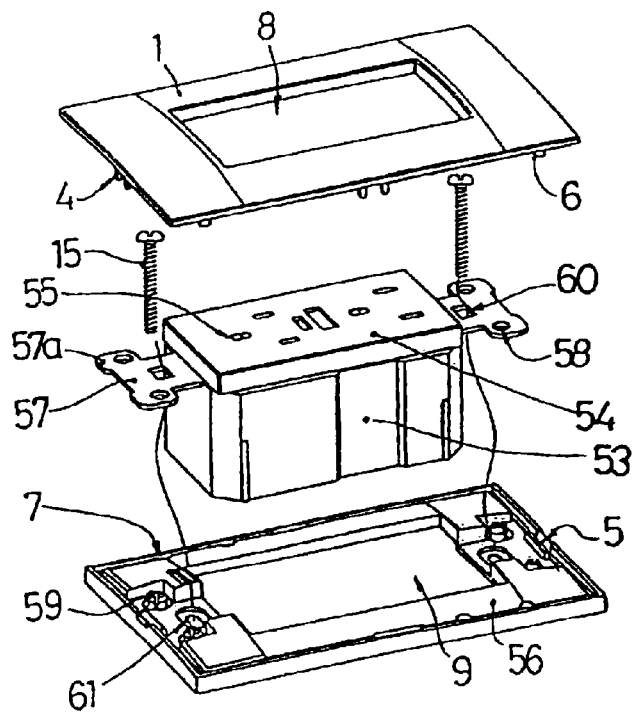
FIG. 30 is a view in perspective of the duplex mechanism provided with a differential showing the characteristic shape of the frame and the external plate, to allow their fastening.
Figure 31:
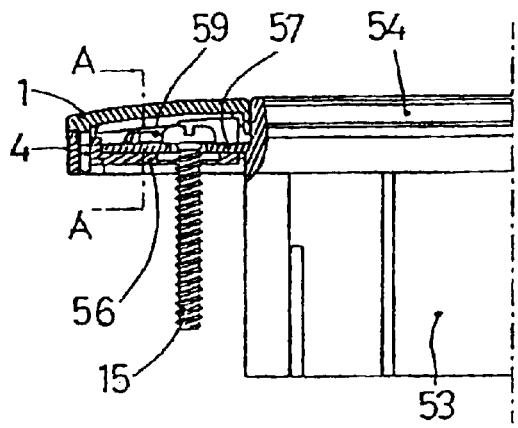
FIG. 31 is a part view of one of the ends of the unit, partly sectional, showing the fastening way of the mechanism with the differential to the frame and the external plate on it; and last.
Figure 32:
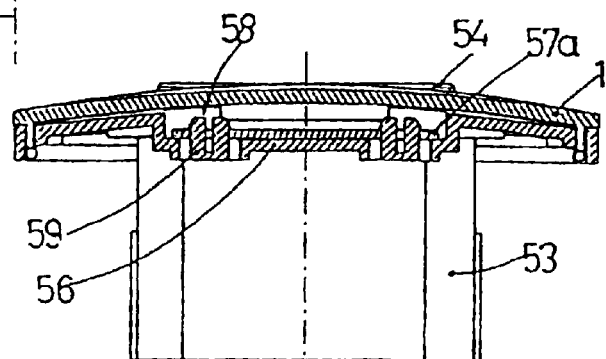
FIG. 32 is a sectional view through AA according to the preceding figure of the end part of the mechanism mounted on the support and showing its fastening on this later.

Last, in the embodiment of the duplex base and which is provided with a differential, the sizes of the body and the frame, as it will be disclosed thereafter, according to FIGS. 30 to 32, will be similar to those of the above mentioned duplex embodiment.

Each of the bodies (18) will be covered with related cover (22) or (37) which will have the openings corresponding to the poles and the earth connections which pertain according to the application of the base plate of the electrical outlet.

On the body (18) for base plate of electrical outlet with two tapping points or poles the cover (22) is located and fastened provided with two tapping points openings (23) in the example illustrated (FIG. 9) having a rectangular shape, the so-called American shape.

The perimeter of the cover coincides with that of the body (18) the lower edge of its side faces (22a) being fit on the perimetral horizontal edge (18a) a counter-edge (18a) remaining inside that the body possesses on its tow sides having a larger size.

The two front faces (22b) of the cover (22) possess a recess area (24a) the wall of which is uprightly extended downwards forming prongs (24) having an elastic clamplike fastening, for the said cover (22) within the body (18).

These prongs remain locked by the intermediate step (24b) under the edge of the inclined walls (25) the body itself (18) possess within it together with their front faces.

The said upright walls (25a) remain located behind the said inclined walls (25) which delimit together with the front faces of the body (18) itself, the space where the said prongs (24) will be introduced and fastened.

Figure 9:
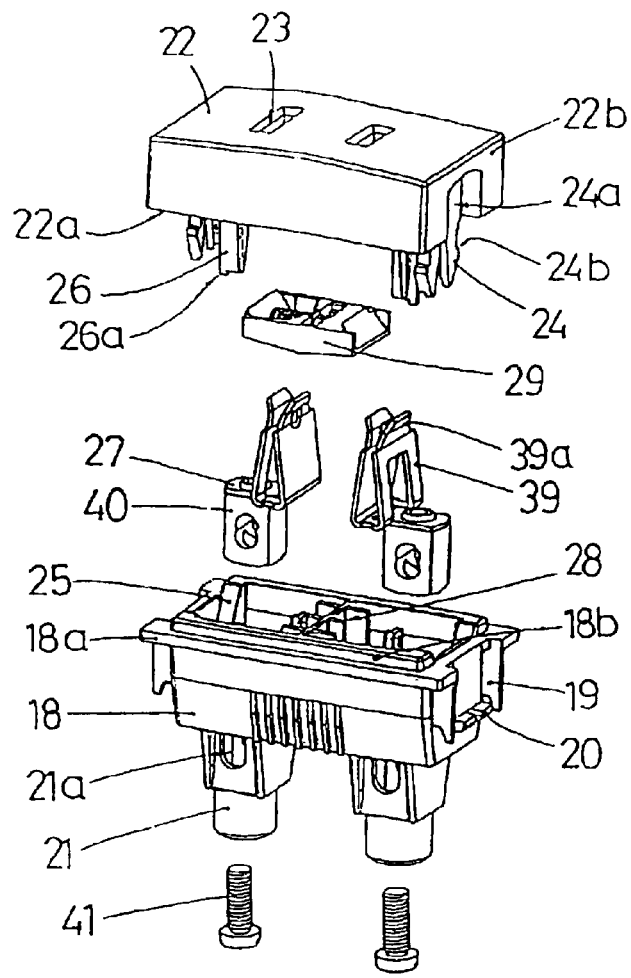
FIG. 9 is a view in perspective and exploded of the base mechanism for the electrical outlet, considered a simple mechanism, in its embodiment with two poles.

Behind the said prongs (24) within the cover (22) other upright walls (26) are located having a triangular profile and the end of which shows a small protrusion (26a) at its external part. The said walls remain positioned when the cover is closed (22) on the body (18) so that the protrusion (26a) is strongly supported on the contact horizontal plate (27) locking it at its place, a place which is delimited by small walls (28) the body (18) possesses in its interior, as it is illustrated in FIGS. 9 and 22 and more particularly in FIGS. 16 and 17.

The upright small walls (28a) are located on the internal faces of the walls of the body (18) arranged so that the contact sheets (27) remain positioned on both sides thereof, guaranteeing that the said sheets do not move and, therefore, the position of the said contact (27) is kept.

Under the cover (22) and between the two openings (23) of its top face, there is a space where a safety plate (29) of the mechanism is located.

This space is delimited by the top part of the upright walls (26) and has a suitable size for allowing that the said safety plate (29) is placed as well as allowing its lengthwise travel.

The said plate (29) has the shape of a rectangular prismatic tray with its base having a slight longitudinal double slope, similar to a rocker, and it possesses at its right part, according to the reference of the FIGS. 18 to 21, a sharp ramp (29a) inwardly inclined as well as a ramp on the left area, open and outwardly inclined (29b). In the central recess of this part there is a cylindrical helical spring (30) fixed between the small side walls (31) and the front ones (31a) the plate proper (29) possesses. This plate in addition possesses between the small side walls (31) and the beginning of the internal ramp (29a), an opening at its base (32) through which the upright wall (33) that the cover (22) possesses will be introduced under its internal face, near to one of the openings (23) of the pole.

Located this way the plate (29) at the area under the cover (22), it will prevent the passage through the openings (23) inwardly the areas of contacts, as it is fully locked by the said plate (29) kept in this position by the action of the spring (30) and the two ramps (29a) et (29b) remaining under the said openings (23).

Figure 18:
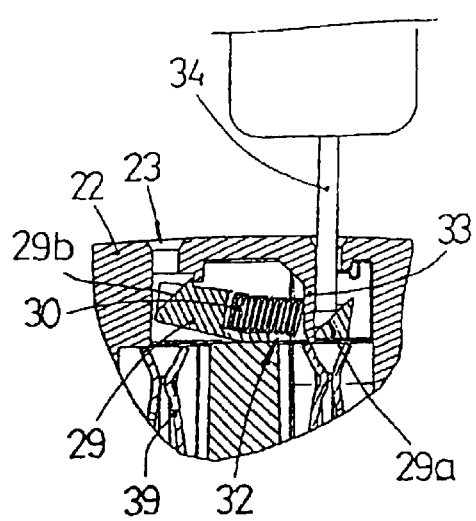
FIG. 18 to 21 show in section a sequence of the operation and protecting action of the safety plate which illustrate.
Figure 19:
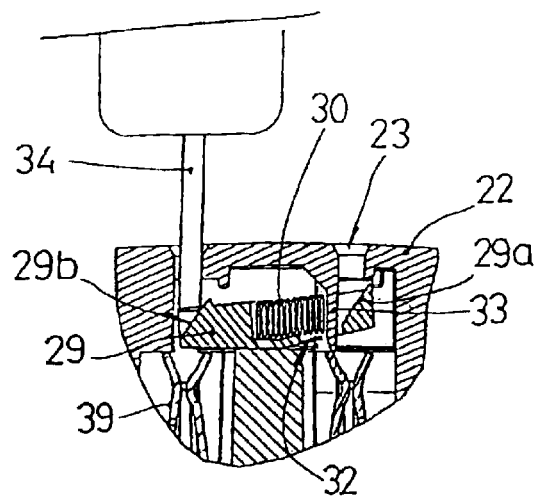

In the moment that, unwillingly, an elongated object (34) is introduced through one of the openings (23), it would provide pressure as illustrated in FIG. 18 the ramp (29a) of the plate (29) provoking that its other end is lifted by the rocking effect but without moving longitudinally, keeping the plate at its place by the action of the spring (30).

This lift of the opposite side is due to the shape of the base of the plate (29) in two slight slopes such as a swing or a rocker, as already mentioned above.

In the case that an elongated or sharp-pointed object is introduced through the other opening (23), the action on the plate (29) and concretely on the ramp of the opposite end (29b) provokes that the opposite end lift but not that the plate (29) moves lengthwise therefore it is still impossible to have access to the area of the contacts, a basic function of this safety plate (29).

Figure 10:
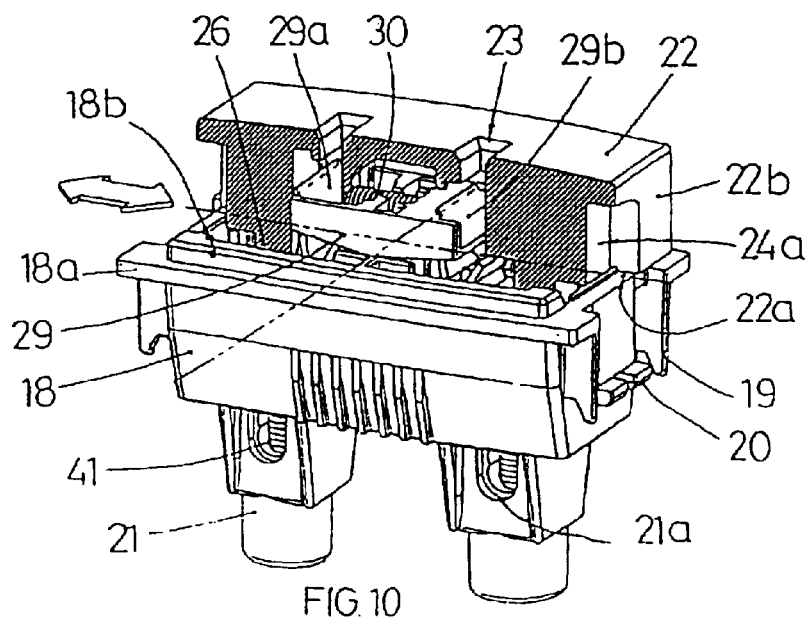
FIG. 10 is also a view in perspective of same mechanism mounted and partly sectional on its top part to show the arrangement of a safety plate.
Figure 11:
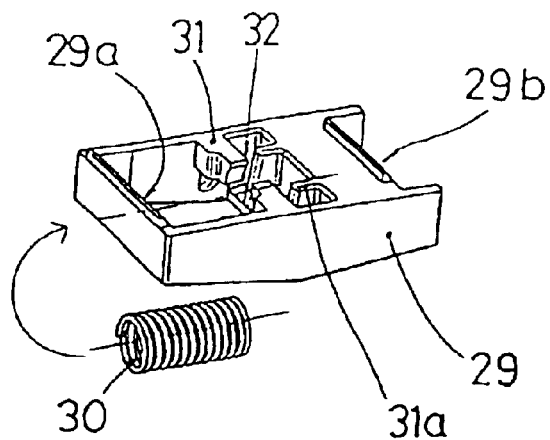
FIG. 11 is a detail of such safety plate, shown in the preceding figure, showing the elements composing it separated and exploded.
Figure 20:
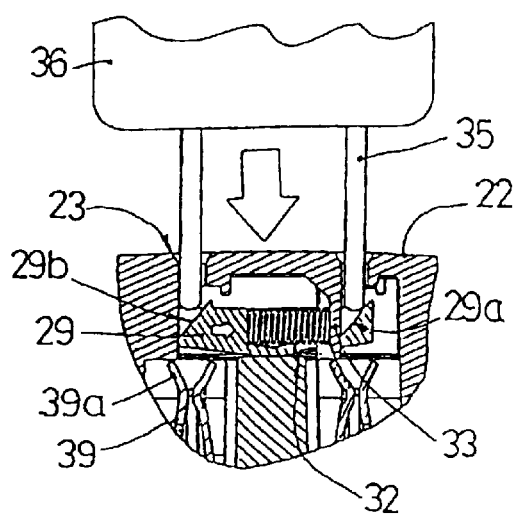
Figure 21:
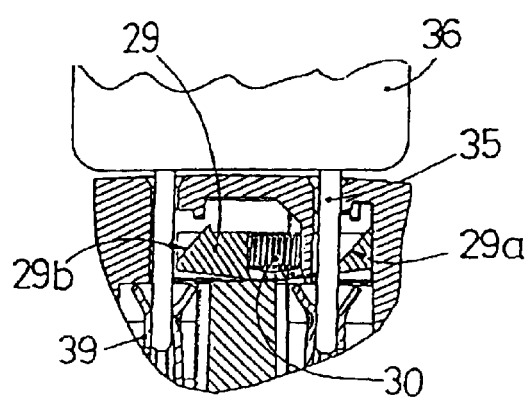

At the moment that, at same time the prongs (35) of a plug (36) are introduced through the openings (23), the pressure exerted by them at same time on the two inclined surfaces (29a) and (29b) will provoke a component of force which will move the plate (29) lengthwise in the sense shown by an arrow in FIGS. 10 and 20.

In the embodiment of the base plate of an electric outlet with two poles and an earth connection, the cover (37) (FIG. 22) is virtually identical to that of the base plate of the electrical outlet with two poles (reference (22)) but in addition provided with an opening (23a) for the earth connection).

In the relative to the body (38) (see also FIG. 22) it is similar to the body (18) but it has at its lower part three cylindrical tubular appendages (21) instead of two where are located the two contacts of the poles and the contact of the earth connection.

Figure 25:
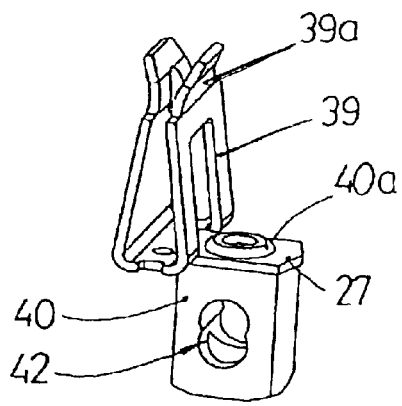
FIG. 25 is a view in perspective at larger scale of one of the contacts corresponding to the poles of the plate base of the electrical outlet.
Figure 26:
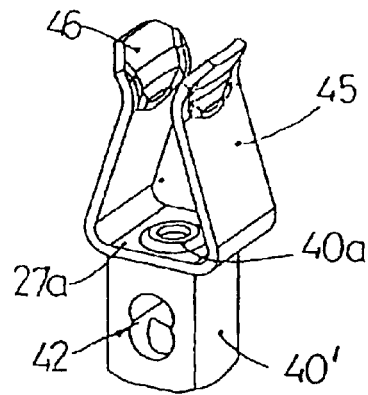
FIG. 26 is a view in perspective, also at a larger scale of the contact corresponding to the earth connection.

The essential characteristics are the shape and structure of these contacts, represented in FIGS. 25 and 26, the first, the contact (27) which will be situated in the area of the poles of the base plate of the electrical outlet, and the second, the contact (27a) of the earth connection.

The normal contact possesses a metal base sheet (27) and in one of its sides two upright sheets (39) converging at their top part, obtained by die cut and folding and bellmouthed at its top ends (39a) as an elastic clamp, so that when the prong (35) of the plug (36) is uprightly introduced within it, the said prong will remain strongly locked between both sheets (39) and more particularly by its ends (39a) guaranteeing a perfect and sufficient contact.

The base sheet (27) will remain fastened on the connecting body (40), a prismatic block, on which base the required connecting screw (41) will be screwed at same time that on its sides openings (42) will be pierced to allow the passage of the electric cable to be connected (not shown).

The said fastening will be carried out by means of the rivets (40a) located on the top face of the connecting body (40) which, after it has been introduced through the hole (43) the contact base sheet (27) possesses will be riveted to prevent that both parts are separated.

These connecting bodies (40) as well as the screws (41) remain arranged within the hollow cylinders (2) of the base of the body of the mechanism. Also, the top part having a trunco-pyramid shape of the said cylindrical appendages (21) are provided with openings (21a) coinciding with those of the connecting bodies (40) to allow the introduction of the cables to be connected.

The contact for the earth connection (27a) is constituted by a metal sheet folded in the shape of a lyre (45) and ends in a clamp (46) with its flat base fastened on the related connecting body (40') having a shape identical to that of the other contacts by means of the rivet (40a) located through the hole (44).

As well at the contact of pole as at the earth connection, the respective bellmouthed ends (39a) and (46) even possess internal embossments which guarantee that the contacts are best adhered on the prongs (35) of the plug (36).

Figure 23:
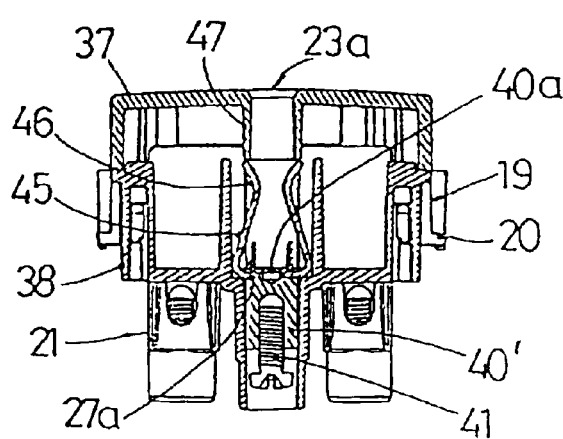
FIG. 23 is an elevation view of the mechanism of the view of above figure, sectioned by the longitudinal plane corresponding to the center of the housing of the earth connection contact.
Figure 24:
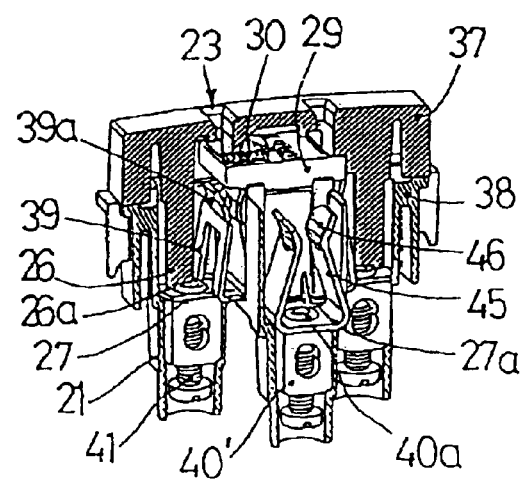
FIG. 24 is a view in perspective and partly sectional by its top part of the total mechanism, according to above figure, showing the location of the contacts.

Last, it must be said that this last contact (27a), for earth connection remains tightly fastened at its place thanks to the action of the wall (47) provided emerging under the cover (37) which surrounds the opening (23a) of the earth connection and uprightly goes down until coinciding with the top part or clamp (46) of the sheet (45) of the said contact of earth connection (27a). In this arrangement, the lower edge of the wall (47) suitably fastens the contact preventing its unwilling displacement, which is effective at the moment in which the cover (37) is closed on the body (38). This feature is quite clear in FIG. 23.

In the example of embodiment of a duplex base plate for an electrical outlet, (see FIG. 27), the cover (48) shows a shape similar to that of the covers disclosed before and it has the two pairs of openings (23), American type, and with each pair, the related opening (23a) for the earth connection, each group of openings being located at the end areas of the said cover (48).

The said cover (48) is closed over the body (49), having characteristics similar to those of the above disclosed bodies (18) and (38) but with bigger sizes coinciding with those of the central opening (9) of the frame (3) and obviously of the external plate (1).

In both side faces of this body (49) there are related flanges (19) and (20) allowing to fasten the said body within the frame (3).

Also, on the side bigger faces (48a) of the cover (48), the elastic prongs (24) are locate as a downwards extension of the area of the embedded wall (50) of the said side faces.

All this is arranged in a way similar to the above disclosed covers and bodies to allow they are quickly fastened and removed, under pressure and this being due to the elasticity of the material used for making different components.

The base plate of the electrical outlet in its duplex embodiment is also provided and in an analogous way to that disclosed for the two safety plates (29) with all its elements placed at the given place, under the related openings (23) for poles.

It is also provided with the logic contacts (27) for poles and (27a) for the earth connection. These contacts are arranged at the place corresponding to the interior of the body (49) and subject in an identical way as in prior embodiments.

However, the said duplex embodiment has the particularity that the two contact points (27) for poles as well as the contacts for earth connection (27a) are connected by means of contact bars (51) and (52). The first contact bar (51) connect the two contacts for earth connection (27a), joining them by the lower face of its base, an union guaranteed by the fact that each contact remains perfectly locked by the rivet (40a) of the connection body (40') which is located through a hole (51a) of the contact.

The junction between the two contacts of poles (27) and the related of the opposite area is carried out by means of the contact bars (52) identical and parallel, which remain locked in same way by means of the rivet (40a) arranged through the hole (52a) of mentioned contacts (52).

The rivets (51b) and (52b) fasten the related contacts, respectively (27a) and (27).

As it has been stated, the three connection bodies (40) and (40') identical to those disclosed for prior embodiments, remain located within the appendages (21) which in this case, as it has been seen, are only three and have connection screws (41) and openings (21a) available for the passage of the electric cable to be connected.

The base plate of the electrical outlet in its duplex embodiment, in addition provided with the differential GFCI (FIGS. 30 to 32) shows a body (53) suitable for this embodiment, the cover of which (54) is provided with a series of predetermined openings (55). The said cover has dimensions identical to those of the openings (8) and (9) of the external plate (1) and the frame (56).

The said plate (1) remains locked on the frame (56) in an identical way as it is fastened on the frame (3) of the other embodiments.

The frame (56) for this last embodiment possesses variations which are disclosed below with the purpose of allowing that the body (53) is fastened and locked.

The said locking is obtained thanks to two horizontal flat flanges (57) located at the ends of the cover (54) flanges provided at their end flaps (57a) with holes (58) which are fit under pressure on the cylindrical buttons (59), of the kind of an elastic clamp, located within the top face of the frame (56) just at the end areas where the said flat flanges (57) are located.

The said flanges are also provided with centered holes (60) to allow the passage of the screws (15) for fastening the frame (56) at its place of installation, holes which correspond to other holes (61) of the said frame (56).

The essential characteristics of the improvements object of this patent of invention having been sufficiently disclosed, it must be said that any variation of the sizes, external shapes, appearance and finish as well as any kind of material used in the embodiment of the said improvements shall absolutely not alter the said spirit which is summarized in following claims.

What is claimed is:

1. A low voltage device to be used as an electrical outlet base plate, comprising a frame; an external plate fittable under pressure on said frame and fastenable by elastic plugs having protrusions for easy removal of said external plate, said frame having a rectangular central opening allowing to place one or several mechanisms to be installed and fastened, while said external plate is provided with one or several related openings depending on the mechanisms to be installed, said mechanisms having a body for application of a base plate for electrical outlet with two poles, a base for electrical outlet with two poles and earth connection, a base plate for electrical outlet with two palm of poles with its related earth connection in a duplex arrangement, and a base plate for electrical outlet of the duplex arrangement provided with a differential ground fault circuit interrupter, each of said base plates being provided with a safety plate device for preventing access within an area of contacts.

2. A low voltage device as defined in claim 1, wherein said openings of said external plate correspond to said rectangular central opening of said frame and have sizes and arrangements varying depending on whether three, two or one of said mechanisms are installed on said frame, said openings of said external plate being identical and coincident with said opening of said frame where three of said mechanisms are installed, with one central opening being only one with sizes coinciding with said mechanisms when a single mechanism is installed and two other of said openings being located symmetrically on both sides both with coinciding sizes with said mechanism when two of said mechanisms are installed.

3. A low voltage device as defined in claim 1, wherein said body has a base provided with hollow cylindrical appendages having at their beginning a trunco-pyramid shape, such that in an interior of said hollow cylindrical appendages contact connection bodies of said mechanism remain, said appendages having connecting screws arranged and provided with openings for passage of electrical conductors.

4. A low voltage device as defined in claim 1, wherein said mechanism of the base plate for electrical outlet with two poles is formed by said body on which a related cover is fit under pressure and locked by front flanges, said cover having two openings corresponding to two poles, said cover having an internal face provided with upright walls located close to said front flanges and ending in a protrusion leaning against a related contact base within said body, said cover on said internal face being also provided with a space for placing said safety plate device located under said two openings so as to close access through said cover, said body having central walls for limiting a space for locating contacts and side walls for clamping sets of the contacts.

5. A low voltage device as defined in claim 1, wherein for application of the electrical outlet with two poles and earth connection, a cover is provided with related openings, while in said body a contact for the earth connection is located and locked by a wail of said cover around the opening for the earth connection, said body also having a third cylindrical appendage one lowerface of its base for locating a related connection body.

6. A low voltage device as defined in claim 1, wherein said safety plate is configured as rectangular base plate with a double slope, and a top face with two ramps inclined in a same sense one inwardly and the other at an opposite end outwardly; and further comprising a cylindrical helical spring located between said ramps and leaning against an upright wall of a cover which crosses said safety plate, said ramps being located under two openings of said cover so that when an object is introduced in one of said openings an opposite part of said plate is lifted but is not moved, while when two pins of a plug are introduced at the same time into said openings by means of a component of forces a side travel of said plate is performed overcoming an action of said spring and allowing a passage of the pins toward a die cut folding sheets Joined to a connection body allowing a contact, and said plate comes back to its initial position when said pins are removed.

7. A low voltage device as defined in claim 1, wherein contacts of the poles include a base plate locked by a rivet on a connection body and two upright sheets folded as a clamp with bellmouthed top ends for fastening a prong of said plugs, while contacts of the earth connection include a base plate fastened to a connection body and upright sheets which have a shape of a lyre with bellmouthed ends.

8. A low voltage device as defined in claim 1, wherein for the application of the base plate in the duplex arrangement, dimensioning of the body and of its related cover is identical to a dimensioning of said opening of said frame so that only one mechanism is located on said frame.

9. A low voltage device as defined in claim 1, wherein for the application of the base plate in the duplex arrangement, within said body two contact units are located for the two poles and its corresponding earth connection, with each unit having at an end area of said body only three connection bodies, two of which connection bodies being for contacts of the poles end a third one of said connection bodies being for the contacts of earth connection, with related contacts being connected by contact bars, wherein said body is provided with only three cylindrical appendages on a lower face of a base of said body.

10. A low voltage device as defined in claim 1, wherein for application of the duplex base equipped with differential ground fault circuit interrupter, said frame has cylindrical buttons formed as elastic clamps, wherein a cover has a side flange provided with holes fitting on said cylindrical buttons and with flanges protruding from front sides of the cover.

* * * * *